(No Model.)

E. R. WILDER.
TEST CIRCUIT FOR BURGLAR ALARM SYSTEMS.

No. 486,149. Patented Nov. 15, 1892.

Witnesses:
Inventor:
Edmund R. Wilder
By Francis W. Parker,
Attorney.

UNITED STATES PATENT OFFICE.

EDMUND R. WILDER, OF KANSAS CITY, MISSOURI, ASSIGNOR TO THE WILDER DUPLEX ELECTRIC BURGLAR ALARM AND MESSENGER COMPANY, OF WEST VIRGINIA.

TEST-CIRCUIT FOR BURGLAR-ALARM SYSTEMS.

SPECIFICATION forming part of Letters Patent No. 486,149, dated November 15, 1892.

Application filed August 22, 1891. Serial No. 403,477. (No model.)

*To all whom it may concern:*

Be it known that I, EDMUND R. WILDER, a citizen of the United States, residing at Kansas City, in the county of Jackson and State of Missouri, have invented a certain new and useful Improvement in Test-Circuits for Burglar-Alarm Systems, of which the following is a full, clear, and exact specification.

My invention relates to test-circuits for burglar-alarm systems and the like, as hereinafter shown, and has for its object to provide means whereby from a central station a series of outlying stations or points may be made to automatically signal the central station, so as to indicate whether or not the connections from each of such outlying stations to the central station are in order.

My invention is illustrated in the accompanying drawings, wherein—

Figure 2:
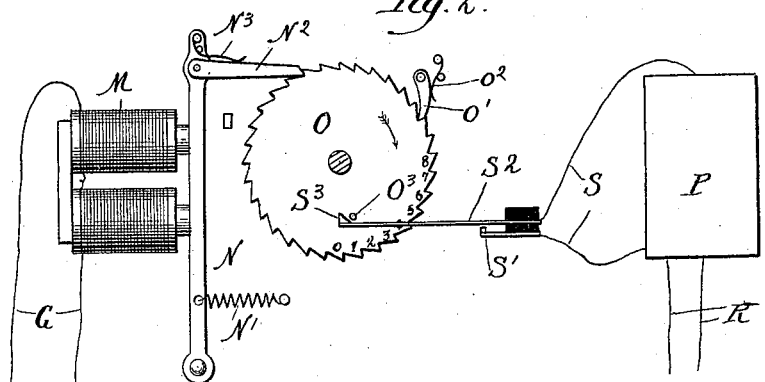
Figure 1:
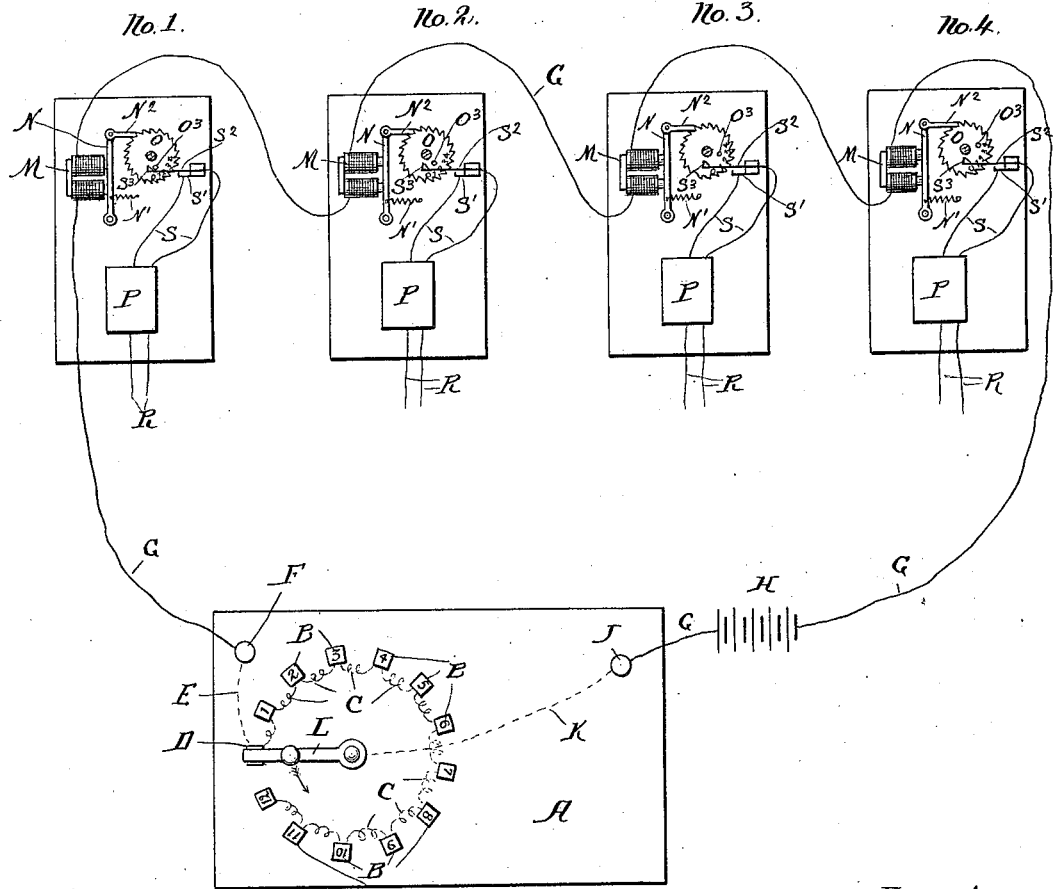

Figure 1 is substantially a diagrammatic view of a test-circuit. Fig. 2 is a detail of one of the circuit-closers at the outlying stations.

Like parts are indicated by the same letter in each figure.

A is the tester at the central station, having a series of contact-plates B B thereon. These contact-plates may be numbered consecutively and are connected one with the other by the short conductors C C. One unnumbered plate D is connected by the conductor E with the binding-post F, from which leads one end of the test-circuit G, which includes the battery H, and returns to the other binding-post J, from which the conductor K leads to the hand L, which is adapted to successively engage the contact-plates B B and to break the circuit when not in engagement with one of such plates.

M M are magnets placed one at each outlying station and each included in the circuit G, so as to be normally energized. Each magnet has a pivoted armature N, provided with a retracting-spring N' and a dog $N^2$, which is normally downwardly drawn by a spring $N^3$, so as to be held in engagement with the ratchet-teeth on the wheel O.

O' is a dog put in engagement with the teeth by the spring $O^2$ to prevent the wheel O from losing its proper position during the operation of the magnet M. Each ratchet-tooth is marked with a number except one tooth, which is marked "Zero." The teeth are numbered in regular succession, and each wheel is provided with a pin $O^3$, projecting laterally in a radial line with one of such ratchet-teeth. Each outlying station has associated with it a given number, and a series of stations will be numbered, respectively, 1 2 3 4, &c. The wheel at station No. 1 would have the pin in a radial line with tooth No. 1, and the wheel at station No. 2 with tooth No. 2, and soon throughout the series. The central-station tester should have the same number of contact-plates as teeth on the ratchet-wheels, and they should be numbered in like manner, beginning with zero. I have shown a less number of plates in the figure in order that the operation of the tester might be more fully illustrated.

P is the outlying-station signaling mechanism, which may be of any kind or character—as, for example, a burglar-alarm and the ordinary local circuits, circuit-closers, and the like, which are associated with it in the usual manner. It is connected by the conductors R R with the central station, so as to give a signal in the usual manner—as, for example, a call when the local or main circuits have been tampered with by a burglar or the like. There is associated with each of such burglar mechanisms a local circuit S, containing at one terminal the contact-piece S' and at the other the same circuit-closing piece $S^2$, on the end of which is the lug $S^3$, lying in the path of the pin $O^3$. When this local circuit is closed by the engagement of the contact S' with the circuit-closer $S^2$, the mechanism in the box P is caused to give a signal to the central station over its connecting-circuit. Obviously these various details could be greatly altered without departing from the substance of this invention.

The use and operation of my invention are as follows: The hand L rests upon the unnumbered contact-plate D and the test-circuit is completed and a current flows over the same, energizing all the magnets M and holding their armatures in the position shown. The several wheels of the successive stations are arranged as shown in Fig. 1, so that the lug $S^3$ is in each case in the radial line with the ratchet-teeth marked zero, and the pin $O^3$ at station No. 1 is in radial line with the tooth marked 1 and at station No. 2 is in a radial line with the tooth marked 2, &c. If now the central-station operator desires to ascertain when the several outlying stations are in good condition, he moves the hand L to the plate 1, thereby momentarily breaking the circuit. When the circuit is broken, each magnet releases its armature and the retracting-spring in each case causes the armature to move forward until arrested by the stop, by which action each ratchet-wheel will be moved forward one notch or tooth. Immediately the circuit is re-established and the magnets and armatures all assume their normal positions. This action, however, will cause the pin $O^3$ at the first station to engage the lug $S^3$ and bring the contact $S'$ and circuit-closer $S^2$ in engagement, thus closing the local circuit S and causing its mechanism in the box P to signal the central station in the usual manner. The operator at the central station thus knows that the signaling mechanism or burglar-alarm at station No. 1 is in proper condition. He therefore moves the hand L forward another plate, when the same operation takes place, except that now the call is returned to station No. 2. This operation is continued until all of the stations have called, whereupon it will be found that the wheels have returned to their original position, and if the number of teeth and the contact-plates is the same the hand L will have returned to the zero at contact-plate. If any station fails to return the signal when thus its local circuit is closed, it is an indication that the circuit of that station is out of order and a man is immediately sent from the central station to examine and repair the same.

Any reasonable number of stations may thus be connected with one circuit-tester, and all the stations may be tested very rapidly and conveniently and frequently. The necessity of sending a man from station to station is obviated.

I claim—

The combination of a series of outlying-station signaling devices with a central-station apparatus connected therewith, a tester at the central station containing a movable arm and a series of contact-plates adapted to be successively engaged by such arm, a circuit containing all of such plates and such arm, a series of magnets, one at each outlying station and included in such circuit, armatures, one for each magnet, a retracting-spring and dog connected with each armature, a ratchet-wheel adapted to be engaged by such dog and to be rotated one tooth at each action by such spring, a pin on such plate, a local starting-circuit for such station-signaling mechanism, and a circuit-closer therefor in the path of such pin, said ratchet-wheels arranged so that each will move one tooth at each action and one of the local starting-circuits will be closed at each action.

EDMUND R. WILDER.

Witnesses:
CELESTE P. CHAPMAN,
FRANCIS W. PARKER.